UNITED STATES PATENT OFFICE.

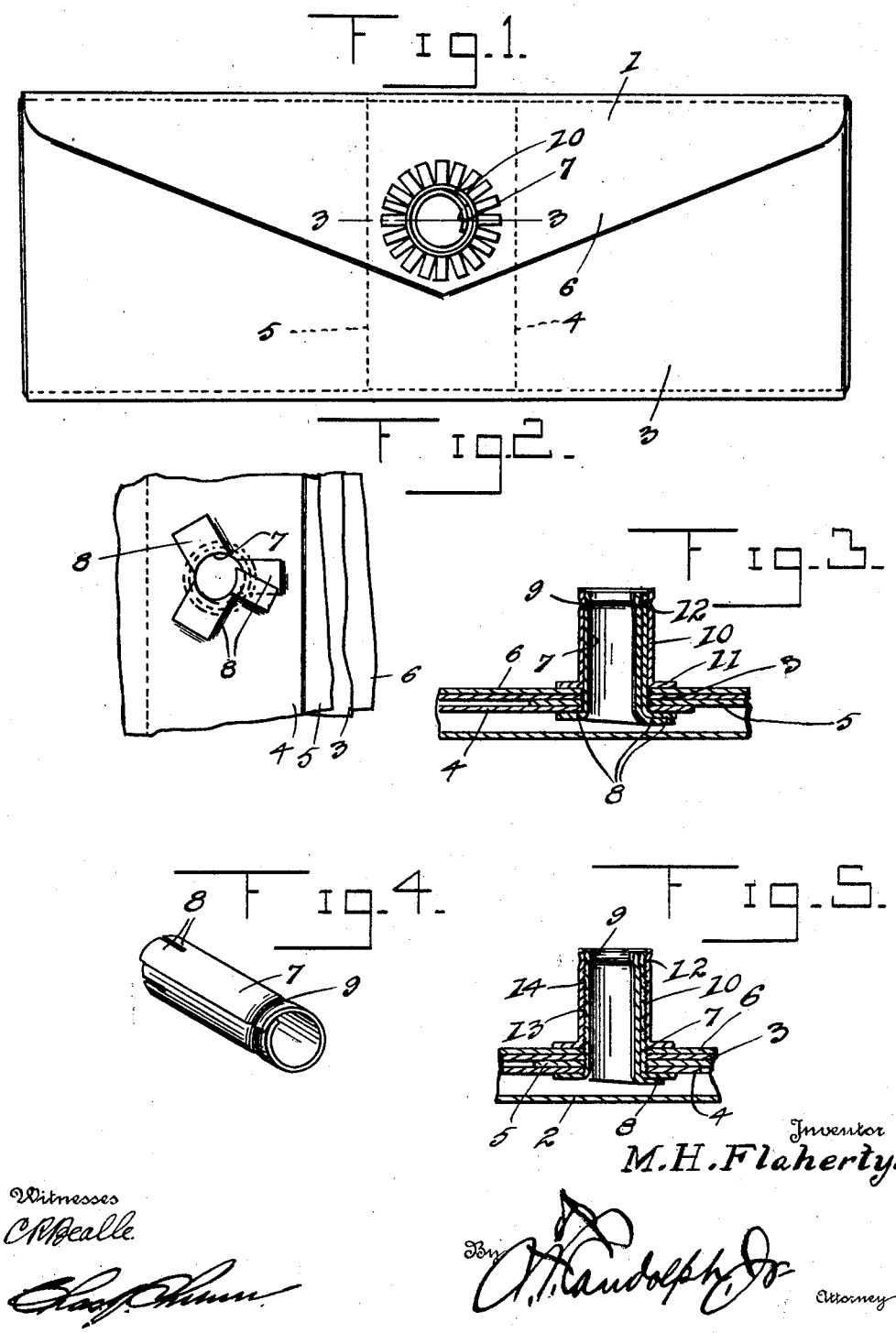

MICHAEL H. FLAHERTY, OF GIRARDVILLE, PENNSYLVANIA.

ENVELOP AND FASTENER THEREFOR.

1,109,410.	Specification of Letters Patent.	Patented Sept. 1, 1914.

Application filed November 19, 1913. Serial No. 801,922.

*To all whom it may concern:*

Be it known that I, MICHAEL H. FLAHERTY, a citizen of the United States, residing at Girardville, in the county of Schuylkill and State of Pennsylvania, have invented certain new and useful Improvements in Envelops and Fasteners Therefor; and I do hereby declare the following to be a full, clear, and exact description of the invention, such as will enable others skilled in the art to which it appertains to make and use the same.

My invention relates to new and useful improvements in envelops and fasteners and more particularly to a fastener which will effectually seal the envelop so that unauthorized persons cannot open or unseal the envelop without destroying the same.

An important object of the invention resides in the provision of a device such as above described which provides for the sealing of an envelop in a reliable and effective manner so that any attempt by unauthorized persons to open or unseal the envelop may be detected and that makes it necessary to destroy the envelop to remove the contents thereof.

A further object of importance is to provide a comparatively simple and inexpensive fastener for an envelop that consists of few parts is reliable and efficient in its operation and which is cheap to manufacture.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which, similar reference numerals designate corresponding parts: Figure 1 is a top plane view illustrating the device in assembled operative position, Fig. 2 is a bottom plane view illustrating the manner of securing the fastener to the envelop, Fig. 3 is a sectional view taken on line 3—3 of Fig. 1 illustrating the fastener in assembled position, Fig. 4 is a detail perspective view of one of the members of the fastener, and Fig. 5 is a sectional view of a slightly modified form of my fastener wherein the two elements comprising the fastener are screw threaded.

Referring more particularly to the drawings forming a part of this specification and in which like numerals are employed to designate corresponding parts, the numeral 1 designates as an entirety an envelop consisting of the usual front and rear flaps 2 and 3, end flaps 4 and 5 and sealing tongue 6. Secured to one of the end flaps of the envelop after a manner which will be later more fully described is the fastener of my improved construction that consists of a cylindrical tube 7 that is formed by rolling a strip of rectangular and suitable metal to form a hollow cylinder. This tube 7 in being formed as above described is resilient and is provided with a plurality of malleable securing tongues 8 that are formed adjacent one end thereof by slitting the tube longitudinally. Adjacent the other end of the tube is an annular groove 9 for a purpose which will be later more fully disclosed. This tube 7 is secured to one of the end flaps 4 and 5 by inserting the tubes therethrough and bending the malleable tongues 8 to lie flat against the face of the flap and in a plane at right angles to the body portion of the tube. In forming this tube 7 the ends of the plate of which the tube is constructed are disposed in overlapping engagement whereby the sliding of the tube is permitted as it is preferably constructed of suitable spring metal.

As a means for securing the flaps of the envelop 1, that is, sealing the envelop there has been provided a sleeve of the cylindrical form designated 10. This sleeve 10 is provided at one terminal with a plurality of malleable tongues 11 and is adapted to be mounted over the tube 7 which is inserted through each of the end flaps 4 and 5, front flap 3 and securing tongue 6 of the envelop 1. The tongues 11 on the sleeve 10 are adapted to be bent to lie at right angles to the body portion and in engagement with the sealing flap 6 of the envelop when the device is in locked position.

Formed adjacent the terminal of the sleeve 10 farthest removed from the tongues 11 is an inwardly struck annular groove that forms an inwardly extending rib or shoulder designated 12. This rib or shoulder 12 is adapted for engagement with the groove 9 that is formed in the tube 7 and serves to lock the members 7 and 10 into engagement with each other and prevents unauthorized persons from opening the envelop without positively destroying the same. To facilitate the placing of the sleeve 10 upon the tube 7 the tube 7 is pressed so that the member 10 may be placed thereon and the tube will spring open and the rib 12 will move into engagement with the groove 9 thus the device is locked and cannot be tampered with by unauthorized persons for the purpose of gaining access to the interior of the envelop without detection or destruction of the envelop.

It will be apparent that there has been provided a fastening device for envelops which will effectually prevent the opening of envelops in a surreptitious manner and which may be cheaply manufactured and readily applied to envelops, particularly of the character hereinbefore described.

Referring particularly to Fig. 5 in which there has been illustrated a slightly modified form of my invention the tube 7 is provided with a plurality of screw threads while the sleeve 10 is provided with internal screw threads adapted to engage the screw threads on the tube.

The construction of the modified form with the exception of the screw threads is identical with that of the preferred form of fastener as there is provided the locking rib and groove 9 and 12 in the modified form as well as in the preferred form for the purpose of locking the device in closed or locked position. This modified form is particularly desirable for use in connection with large heavy envelops adapted to contain heavy matter as it is more desirable to have the fastening means of the modified form for the reason that the locking means provided is more rigid.

It will be apparent that the fastening means as hereinbefore described will prevent surreptitious opening of the envelops as they are adapted to be inserted through each of the flaps of the envelop exclusive of the face flap and the destruction of the envelop is insured to gain access to the interior thereof.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus described my invention, what is claimed is:—

The combination with an envelop of a fastener therefor adapted to be inserted through the several flaps of an envelop, said fastener comprising a tubular member consisting of a single blank of spring metal having overlapping ends to provide a spring tube, a plurality of bendable tongues formed integral with one end of the tube, said tube having an annular groove adjacent the end thereof farthest removed from the tongues, a locking sleeve adapted to be mounted upon said tubular member and having an annular rib adjacent one end to fit within the groove in said tube and a plurality of bendable tongues formed integral with the inner end of said locking sleeve and arranged to be bent into engagement with the outer face of the outermost of the envelop flaps, said first named bendable tongues being bent at right angles to the body portion and into engagement with the inner face of the innermost of the envelop flaps.

In testimony whereof I affix my signature in presence of two witnesses.

MICHAEL H. FLAHERTY.

Witnesses:
B. FRANK WAGNER,
L. B. WAGNER.

Copies of this patent may be obtained for five cents each, by addressing the "Commissioner of Patents, Washington, D. C."